(12) United States Patent
Schlittmeier et al.

(10) Patent No.: US 9,071,369 B2
(45) Date of Patent: Jun. 30, 2015

(54) OPTICAL WAVEGUIDE SYSTEM FOR A DISPLAY DEVICE AND DISPLAY DEVICE

(75) Inventors: Thomas Schlittmeier, Altdorf (DE); Gregor Sauer, Butzbach-Griedel (DE); Alfred Brunhofer, Grafenwiesen (DE)

(73) Assignee: Robert Bosch GmbH, Stuttgart (DE)

( * ) Notice: Subject to any disclaimer, the term of this patent is extended or adjusted under 35 U.S.C. 154(b) by 199 days.

(21) Appl. No.: 13/821,026

(22) PCT Filed: Sep. 7, 2011

(86) PCT No.: PCT/EP2011/065427
§ 371 (c)(1),
(2), (4) Date: Mar. 6, 2013

(87) PCT Pub. No.: WO2012/032072
PCT Pub. Date: Mar. 15, 2012

(65) Prior Publication Data
US 2013/0163271 A1 Jun. 27, 2013

(30) Foreign Application Priority Data
Sep. 10, 2010 (DE) .......................... 10 2010 040 534

(51) Int. Cl.
*G01D 11/28* (2006.01)
*H04H 60/04* (2008.01)
*G02B 6/04* (2006.01)
*F21V 8/00* (2006.01)

(52) U.S. Cl.
CPC ................. *H04H 60/04* (2013.01); *G02B 6/04* (2013.01); *G02B 6/0008* (2013.01)

(58) Field of Classification Search
CPC ........... G02B 6/0001; G02B 6/04; G02B 7/00
USPC .............................. 362/85, 555, 559; 381/119
See application file for complete search history.

(56) References Cited

U.S. PATENT DOCUMENTS 4,677,674 A * 6/1987 Snyder ............................ 381/58
4,879,751 A * 11/1989 Franks et al. .................. 381/119

(Continued)

FOREIGN PATENT DOCUMENTS

DE 4102448 7/1992
EP 2184728 5/2010

(Continued)

OTHER PUBLICATIONS

PCT/EP2011/065427 International Search Report dated Nov. 17, 2011 (Translation and Original, 6 pages).

*Primary Examiner* — Ali Alavi
(74) *Attorney, Agent, or Firm* — Michael Best & Friedrich LLP

(57) ABSTRACT

The invention relates to an optical waveguide system (20) for a display device (1) and to such a display device (1), wherein the optical waveguide system (20) comprises at least one optical waveguide group (20-1, 20-2, 20-3, 20-4, 20-5, 20-6), wherein at least one of the optical waveguide groups (20-1, 20-2, 20-3, 20-4, 20-5) comprises: several optical waveguides (18) made of a material that is transparent to the light of a LED (14), spacers (34) for adjusting a distance of an interspace (30) between a circuit carrier (12) and a front panel (2), and a housing (22) which is made of a material that is intransparent to the light, surrounds each of the several optical waveguides (18) and connects the optical waveguides (18) and the spacers (34) among each other and to each other.

19 Claims, 4 Drawing Sheets

(56) References Cited

U.S. PATENT DOCUMENTS

| | | | |
|---|---|---|---|
| 5,940,521 A * | 8/1999 | East et al. | 381/119 |
| 6,198,872 B1 * | 3/2001 | Lipson et al. | 385/117 |
| 6,249,381 B1 * | 6/2001 | Suganuma | 359/618 |
| 7,403,828 B2 * | 7/2008 | Bader et al. | 700/94 |
| 2004/0155788 A1 | 8/2004 | Prinz et al. | |
| 2009/0080191 A1 | 3/2009 | Wu | |
| 2009/0244883 A1 * | 10/2009 | Natsume et al. | 362/85 |
| 2009/0304207 A1 * | 12/2009 | Cooper | 381/119 |

FOREIGN PATENT DOCUMENTS

| | | |
|---|---|---|
| JP | S5647577 | 4/1981 |
| JP | 2001100671 | 4/2001 |
| JP | 2008027609 | 2/2008 |

\* cited by examiner

OPTICAL WAVEGUIDE SYSTEM FOR A DISPLAY DEVICE AND DISPLAY DEVICE

BACKGROUND OF THE INVENTION

Mixing amplifiers, particularly portable mixing amplifiers, live performances, generally have a plurality of signal inputs for electrical audio signals, e.g. audio signals for microphones and electric or electro-acoustic instruments, and also outputs for connecting loudspeakers. The user can use appropriate operator control elements, e.g. rotary potentiometers, sliding potentiometers and pushbutton keys, to amplify the individual input channels in a specific way and to adjust further functions, such as signal shaping and special functions such as mono, single, etc., and to put the output signal onto output channels. The operator control elements are generally mounted on a combined display and operator control device which is arranged on the front of the mixing amplifier, for example.

The operator control elements are provided with display panels for visually displaying the status of the operator control elements, e.g. set or unset, and possibly for showing signal levels. The display panels provided are particularly LEDs, which may be arranged next to the respective operator control elements, for example.

To this end, the LEDs are generally mounted on the front panel, which forms the exterior termination of the mixing amplifier, with the front panel containing exit points or apertures for the different operator control elements. The LEDs are actuated via a circuit carrier, e.g. a board having appropriate electrical and electronic components. The circuit carrier is generally provided at a distance behind the front panel, so that an interspace is formed. For the purposes of contact connection, wires are routed from the printed circuit board through the interspace to the LEDs.

The plastic bodies of these LEDs are generally colored in the color in which the LEDs are intended to appear. This color generally does not match the general color scheme of the front panel, so that the LEDs which are off can be identified on the front panel or the user interface thereof.

The level structure of the LEDs is uneven on account of manufacture-related tolerances, which the user can identify when they are mounted on the front panel, since the LEDs are not evenly flush and the fronts of said LEDs do not describe a common vertical plane.

To ensure the desired distance between the board and the front panel, individual spacers are inserted, for example, the handling of which is therefore linked to a certain degree of assembly complexity.

For safe transport during the production process, a particular safeguard is generally required, particularly on account of the sensitivity of the wire connections, and also for the purpose of securely fixing the front panel relative to the board.

WO 2007/110576 A1 describes a mixing console for musical applications which has an input/output interface with different channels. In this case, displays or display panels are provided for showing desired information. In addition, the buttons to be pushed by the user have light sources arranged in them in order to display their activated state.

Although such mounting of light sources in the pushbuttons allows direct visual association and rapid identifiability for the user, the contact connection for the light sources is exposed to the mechanical stresses during adjustment, which means that fractures in the contact connection and similar problems can arise, for example.

SUMMARY OF THE INVENTION

According to the invention, the LEDs are mounted on the circuit carrier, e.g. a board, and are therefore spaced apart from the front panel on which the display panels are formed. The light is routed from the LEDs via optical fibers to the display panels.

This alone achieves a few advantages: by way of example, the invention dispenses with fitting the circuit carrier with wired LEDs, or routing wires between LED and circuit carrier. This achieves greater mechanical robustness, particularly also in the face of vibrations in the portable mixing amplifier. The invention also identifies that the assembly or the work step of fitting wired LEDs is error prone and cost intensive, which surprisingly can be avoided by mounting the LEDs on the circuit carrier and routing light from the LEDs to the front panel.

The LEDs may be mounted directly on the circuit carrier particularly in the form of SMD LEDs, i.e. using SMD (surface mounted device) technology. SMD assembly is technically uncomplicated and ensures an essentially constant distance between the LEDs and the front panel. Since, according to the invention, the optical fibers do not directly abut the LEDs, but rather their rear end face is arranged slightly in front of the LEDs, the production tolerances for the LEDs and for the assembly thereof on the circuit carrier are irrelevant.

The invention therefore permits optical fibers of the same length to be placed between the LEDs and the front panel, said optical fibers therefore being able to be produced in standardized and inexpensive fashion. The optical fibers preferably have their front face protruding through apertures in the front panel, so that the front faces of the optical fibers are directly identifiable on the outside as display panels.

This achieves several advantages: the losses of light in the optical fiber are low. It is even possible to consciously select a material with a certain, but small amount of, opaqueness or blurriness for the optical fibers so that the light transmission does not take place too directionally and hence the light does not emerge from the front face of the optical fibers as a directional beam of light; slight opaqueness allows a more even radiation response to be achieved over a wide solid angle range in the exterior outside the front panel. Such slight opaqueness is not a problem for the intensity and allows a more subdued, even appearance than when LEDs are mounted directly on a front panel.

According to the invention, the optical fibers are combined to form one or more optical fiber groups. In this context, at least one optical fiber group has a plurality of optical fibers which are held together or connected to one another by a common housing. It is therefore possible to combine a multiplicity of optical fibers in a few optical fiber groups and hence to simplify assembly, with a high degree of accuracy for the positioning and routing of the light transmission.

In addition, the housing is preferably also used to prevent spurious exit of light through the (preferably cylindrical) side wall of the optical fiber into the interspace between the circuit carrier and the front panel; to this end, the material of the housing is advantageously sufficiently nontransparent to the light from the LEDs.

The inventive concept is based on the fact that the front panel has exit points or apertures formed on it for the different operator control elements, and light entering the interspace could possibly exit through these exit points and hence be perceived. This could mean that an annoying glow could be identified as background lighting at these exit points, which the invention avoids.

To this end, the optical fibers may be surrounded by suitable housings, particularly housing cylinders or optical fiber cylinders, which hold the optical fibers firmly, e.g. by friction or else by means of an integral bond. For the purpose of manufacture, the optical fibers are injection molded into the housing, or the optical fibers and the housing are manufactured separately and the optical fibers are subsequently pushed into the housing manufactured as an injection molded part.

In addition, the invention provides spacers in order to adjust the distance between the front panel and the circuit carrier. The spacers are connected to the optical fibers, so that a compact assembly is formed. According to one particularly preferred design, the spacers are in the form of part of the housing, so that the housing is of integral design together with spacers, the housing cylinders surrounding the optical fibers and webs or connecting regions used for connection. This allows a very inexpensive design. In addition, particularly simple and secure assembly is made possible. To this end, by way of example, the optical fiber groups can be put onto the front panel, and the circuit carrier can subsequently be put onto this unit and mounted. The spacers can be used as a centering aid for the circuit carrier in this case. This ensures that the optical fibers are positioned precisely in front of the LEDs.

Since the optical fibers are connected firmly to the housing, precise fixing, particularly also the correct position for the optical fibers relative to the LEDs and on the front panel, is made possible.

The light transmission system according to the invention may have a plurality of separate optical fiber groups, in particular. The precise design of the light transmission system according to the invention may be dependent on the position and relative arrangement of the individual display panels that are to be lit by the LEDs. Since the display panels may generally be distributed over the entire front face of a mixing amplifier, e.g. next to the respective operator control elements and for the purpose of displaying signal levels by means of light columns or rows of dots, it is possible to use a plurality of separate optical fiber groups.

Although the use of a plurality of separate optical fiber groups results in somewhat increased handling at first, it achieves greater freedom of configurability in order to mount additional means or devices behind the front panel. In addition, this allows housing material to be saved.

In comparison with the individual wiring of the plurality of LEDs, the use of the optical fiber system allows distinct simplification. The mounting of LEDs using SMD processes is standardized; since the board is fitted with the further components anyway, the SMD LEDs merely need to be included in this fitting. The optical fiber groups can subsequently be put on as compact units, and the front panel and the board with optical fiber groups between them can be combined and fixed by means of screws, for example. In this case, the assembly step of inserting the optical fiber groups does not mean an additional step in comparison with conventional assembly, since a plurality of spacers are required at different positions anyway, and the invention now requires the use of just a few optical fiber groups. The invention thus allows rapid, simple and secure assembly.

The use of the nontransparent housing surrounding the optical fibers also allows different optical fibers to be positioned closely together. It is thus possible for what is known as "crosstalk" or transmission of the light to occur between optical fibers which are close together at a distance of 5 mm or less, for example, which would result in an incorrect display. This is safely prevented by the nontransparent housing which surrounds the optical fibers.

In principle, one or more optical fiber groups may also have just a single optical fiber, in that case preferably combined with at least one spacer.

The use of a transparent or uncolored plastic material for the optical fibers means that the display panels which are formed by the front faces of the optical fibers have a neutral appearance when the LEDs are in the off state. In comparison with the conventional appearance, in which LEDs cast in colored plastic material are provided in the region of the front panel, and preferably protrude forwards through said front panel, this allows a more neutral and therefore visually more agreeable appearance.

According to the invention, it is possible to achieve a very even appearance for the front faces of the optical fibers, since the precise position thereof in front of the front panel can be adjusted more precisely than when LEDs are mounted directly on the front panel, which means that this results in a more even image of levels.

The cylindrical surface of the optical fibers, which is in contact with the housing, may be highly polished or possibly coated, for example, in order to keep down the losses as a result of refraction of light as far as possible.

DETAILED DESCRIPTION

Figure 1:
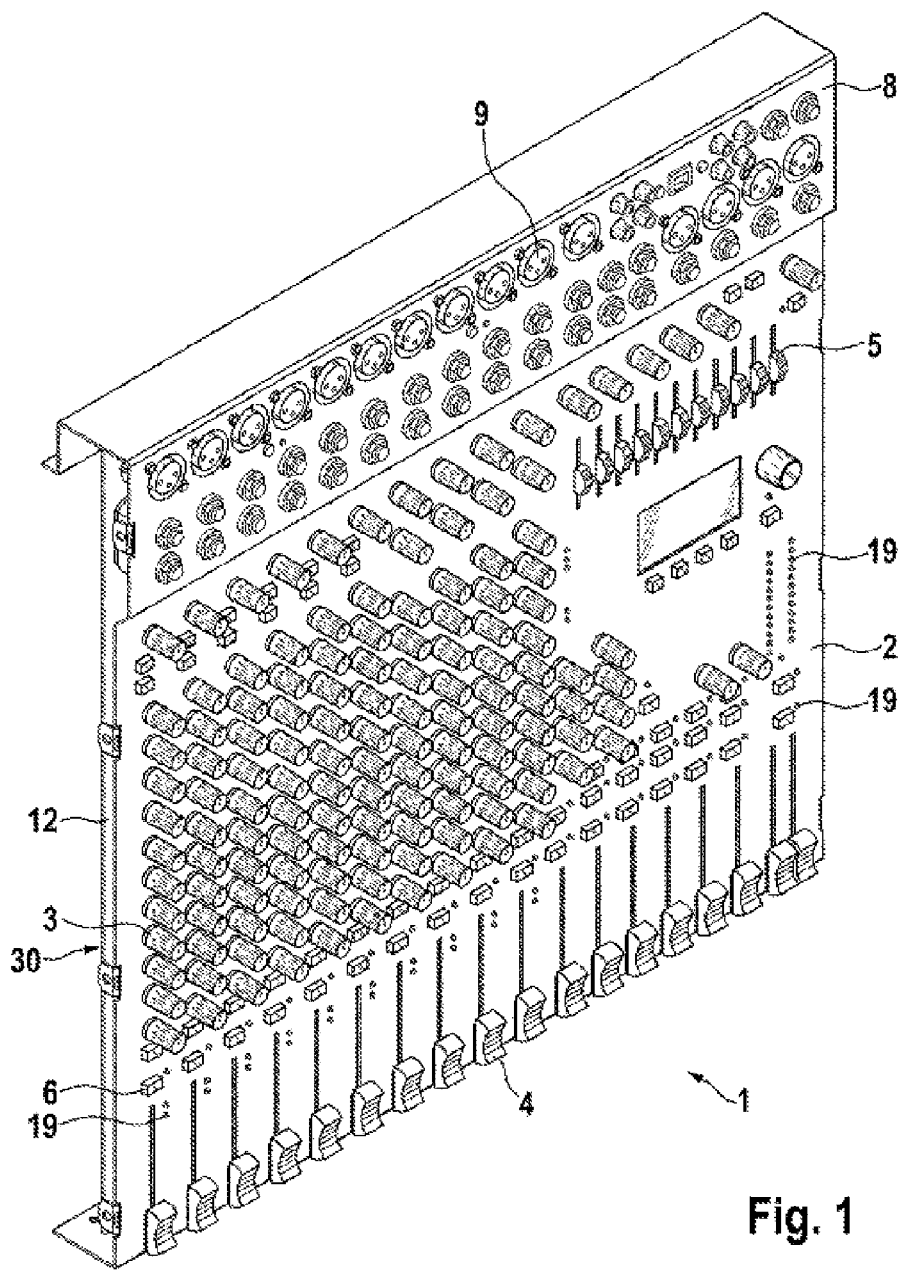
FIG. 1 shows a perspective front view of a display and operator control device according to the invention.
Figure 2:
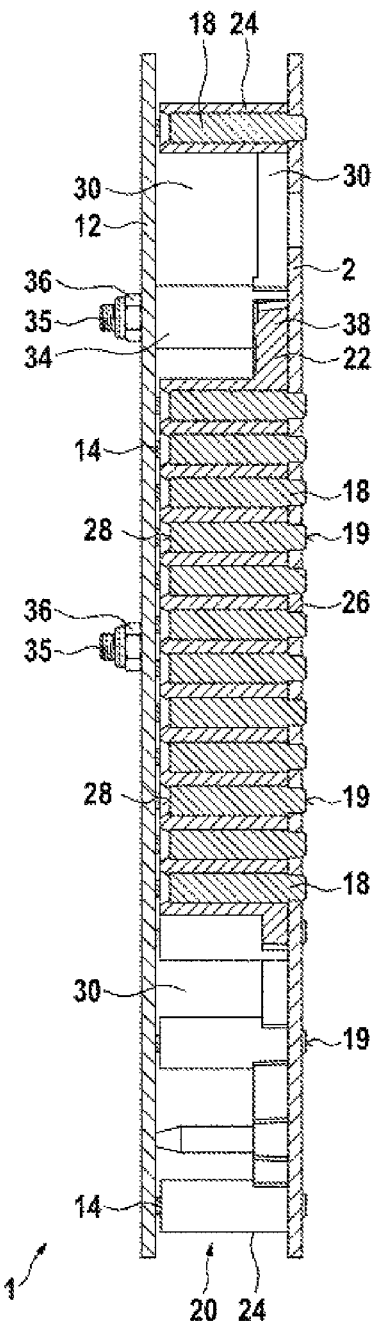
FIG. 2 shows a sectional view of the display and operator control device from FIG. 1 in the region of the fourth optical fiber group.

A display and operator control device 1 which is shown in FIGS. 1 and 2 has a front panel 2 comprising nontransparent plastic material or metal which is provided with a multiplicity of operator control elements 3, 4, 5, 6, which may be rotary knobs 3 for rotary potentiometers, sliding potentiometers 4 and 5 and pushbuttons 6, in particular. The display and operator control device 1 is part of a portable electronic mixing amplifier for audio mixing and amplification for live performances. In addition, a further panel 8 with connecting sockets 9 for connecting different channels, for example, may be provided outside the front panel 2. The mixing amplifier can accept electrical audio signals from various sound sources, e.g. from microphones and electric and electro-acoustic instruments, and can output them to different output channels, to which loudspeakers can be connected directly, in accordance with the setting by the user, which the user adjusts by means of the operator control devices 3, 4, 5 and 6.

The display and operator control device 1 has a board 12 as a circuit carrier 12, said board being provided behind the front panel 2 and at a parallel distance therefrom. Therefore, an interspace 30 is formed between the front panel 2 and the board 12.

Figure 3:
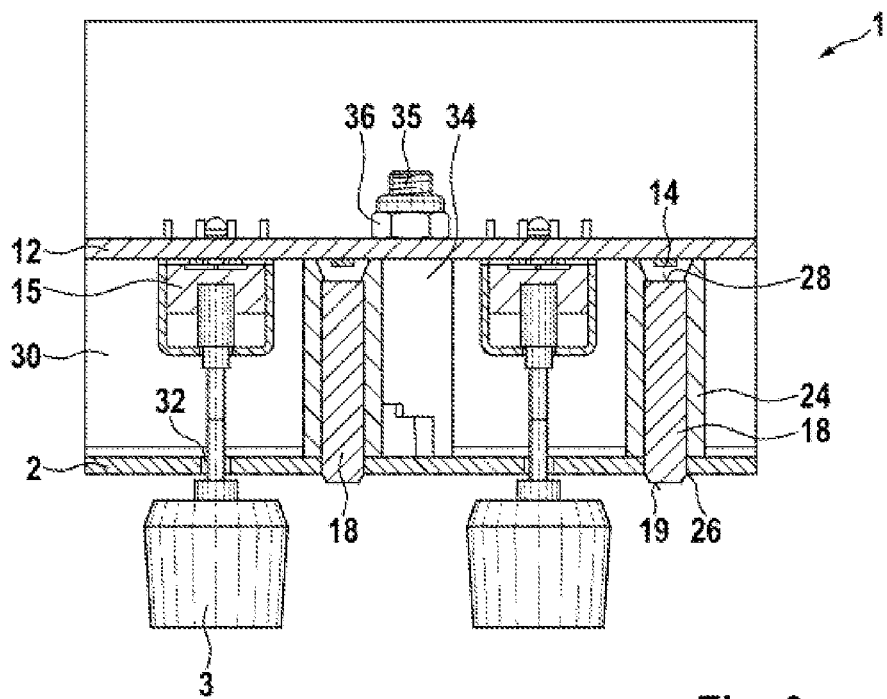
FIG. 3 shows a section in the region of the operator control devices.

As FIGS. 2 and 3 show, the board 12 has SMD LEDs 14 mounted on it, i.e. LEDs 14 which are mounted and contact connected on the top of the board 12 using SMD technology. In addition, the board 12 has rotary potentiometers 15 and further electrical and electronic components, for example, mounted on it, particularly also components for actuating the SMD LEDs 14.

The LEDs 14 have optical fibers 18 positioned in front of them, the rear end faces 28 of said optical fibers being at a short distance from LEDs 14, and the front faces 19 of said optical fibers being used as display panels in the region of the front panel 2. Some of the front faces 19 of the optical fibers 18 are arranged next to pushbuttons 6, for example, as can be seen from FIG. 1, in order to display the "set/unset" status of a respective function, various functions being possible for different input channels. In addition, display panels 19 are also provided on the slide controls 4 and 5, for example, and on the rotary knobs 3.

Figure 4:
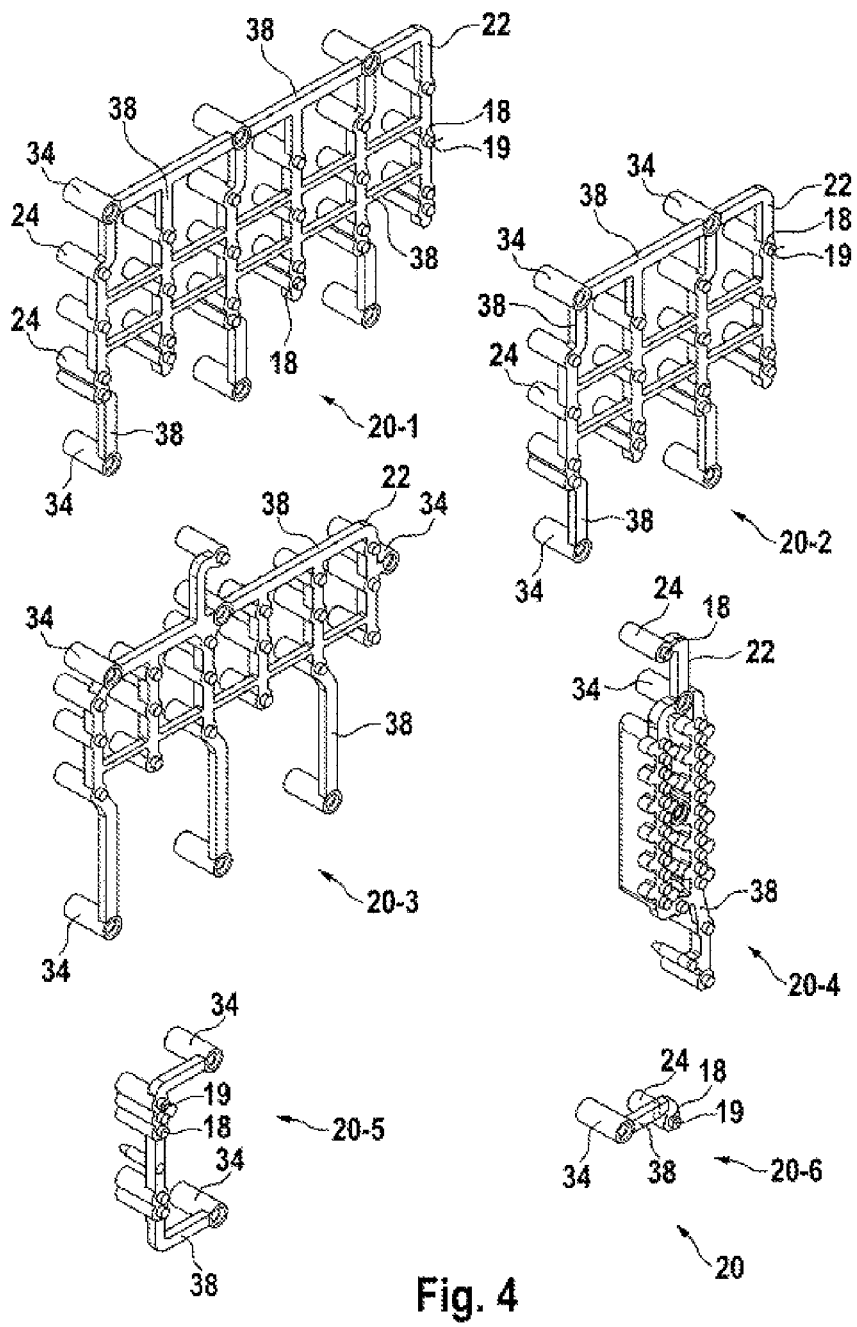
FIG. 4 shows a perspective illustration of the sixth optical fiber groups in the optical fiber system.

The optical fibers 18 are in the form of part of a light transmission system 20 according to the invention, which system is shown in FIG. 4 with its six optical fiber groups 20-1, 20-2, 20-3, 20-4, 20-5 and 20-6. According to the invention, the light transmission system 20 or the individual optical fiber groups 20-1 to 20-6 are placed between the front of the board 12 and the front panel 2. The individual optical fiber groups 20-1 to 20-6 have a different number of optical fibers 18 and also a different geometry or relative arrangement among the optical fibers 18, as required by the corresponding arrangement of the display panels 19 on the front panel 2. In this case, the optical fiber groups 20-1 to 20-5 each have a plurality of optical fibers 18; the optical fiber group 20-6 has just a single optical fiber 18.

All of the optical fiber groups 20-1 to 20-6 have a respective housing 22, the different housings 22 not being denoted differently below for the sake of simplicity; the text below first of all provides a more detailed explanation of the optical fiber groups 20-1 to 20-5, which have a plurality of optical fibers 18. The housing 22 is in each case produced from a plastic material which is nontransparent to the light from the LEDs 14, and said housing has a plurality of housing cylinders 24 which each surround and firmly hold an optical fiber 18. The optical fibers 18 are injection molded in the housing 22, for example, as a result of which their cylindrical outer faces are covered by the nontransparent plastic material of the housing 22. The cylindrical housing cylinders 24 in the form of part of the housing 22 surrounds the optical fibers 18 in the interspace 30 between the board 12 and the front panel 2 completely, as a result of which no light exits at this point, in particular it is also impossible for light to exit from the interspace 30 through apertures 32 which are formed in the front panel 2 for the shafts which run from the rotary knobs 3 to the rotary potentiometers 15.

The two end faces 19 and 28 of the optical fibers 18 are each exposed, the front face 19 of said optical fibers protruding from the front panel 2 somewhat, for example, or having been pushed through apertures 26 in the front panel 2, as a result of which the front faces 19 project somewhat in a common vertical plane, as can be seen from FIG. 3, in particular. The rear end faces 28 of the optical fibers 18 are preferably positioned somewhat in front of the LEDs 14.

The optical fiber groups 20-1 to 20-6 furthermore have spacers 34 which abut the board 12 and the rear of the front panel 2 and define the width of the interspace 30, i.e. the distance between the board 12 and the front panel 2. Advantageously, screws or bolts 35 additionally pass through the cylindrical spacers 34 and are secured by nuts 36 on the rear of the board 12, for example, so that firstly the distance is set and secondly permanent fixing is achieved for the board 12 on the front panel 2.

The housing cylinders 24 and the spacers 34 in individual optical fiber groups 20-1 to 20-6 are connected among one another and to one another by means of a respective connecting framework comprising webs 38, which essentially form a rectangular pattern, for example. In the smallest optical fiber group 20-6, just one web 38 is provided between the single spacer 34 and the single housing cylinder 24. In the further optical fiber groups 20-1 to 20-5, a plurality of webs 38 are provided which are produced with various shaping and with various profiles. As FIG. 2 shows, the webs 38 abut the inside of the front panel 2, so that a flat abutment between the housing 22 and the front panel 2 is produced which therefore ensures that the optical fibers 18 are arranged and positioned in front of the LEDs 14 and on the front panel 2 in a manner which is secure, robust, does not waggle and is mechanically fixed by the spacers 34 and the bolts 35 of the latter. In principle, the housing cylinders 24 may also already have a certain spacer function, since they may abut the board 12 at the side next to the LEDs 14. According to the invention, however, the additional mounting of further spacers 34 is considered to be advantageous in order to achieve a spacer function outside the LEDs 14 and, in particular, so as not to implement the mechanical fixing with corresponding bracing in the region of the LEDs 14.

The individual optical fiber groups 20-1 to 20-6 may, in particular, be in the form of injection molded parts comprising the nontransparent plastic material, and can therefore be manufactured inexpensively. In principle, it is also possible for the six optical fiber groups 20-1 to 20-6 again to be connected to one another by webs 38 and hence to be a common optical fiber group. In the case of the present arrangement and design of the front panel 2, however, the use of a plurality of such optical fiber groups 20-1 to 20-6 is advantageous.

During operation, the SMD LEDs 14 therefore light up and output their light to the optical fibers 18, which route it to the front faces 19 thereof, which serve as display panels. As shown, the front faces 19 are preferably located somewhat in front of the front panel 2 in order to increase visibility from the side. In order to increase this visibility from the side or when viewing obliquely, the optical fibers 18 may be formed from slightly opaque or diffusely scattering material, as a result of which the light exiting at the front faces 19 of said optical fibers is not emitted at high intensity in a forward direction but rather is emitted to the exterior with a greater angular distribution and more evenly.

In order to keep down losses as a result of refraction of light as far as possible, the cylindrical surface of the optical fibers 18, which is in contact with the housing 22 or the housing cylinders 24, is preferably highly polished.

The housing 22 or the housing cylinders 24 furthermore also prevent light from crossing over between the individual optical fibers 18. Particularly when two display panels and hence the optical fibers 18 thereof are in a closely adjacent arrangement, such crossover or breakthrough is possible without shielding action and can possibly result in an incorrect presentation. The inventive use of the housing cylinders 24 effectively prevents such crossover.

When the LEDs 14 are in the off state, the front faces 19 are neutral or have neutral appearance on account of the transparent or somewhat opaque plastic material of the optical fibers 18. In particular, it is not possible to identify individual LEDs.

The invention claimed is:
1. A light transmission system (20) for a display device (1), wherein the light transmission system (20) has one or more optical fiber groups (20-1, 20-2, 20-3, 20-4, 20-5, 20-6), wherein at least one optical fiber group (20-1, 20-2, 20-3, 20-4, 20-5) has:
a plurality of optical fibers (18) comprising a material which is transparent to light from an LED (14);
spacers (34) having a length which defines a distance between a circuit carrier (12) and a front panel (2); and
a housing (22) which is made from a material which is not transparent to light, surrounds each of the plurality of optical fibers (18) and connects the optical fibers (18) and the spacers (34) among one another and to one another.

2. The light transmission system (20) as claimed in claim 1, characterized in that the spacers (34) are in the form of part of the housing (22).

3. The light transmission system (20) as claimed in claim 1, characterized in that the housing (22) surrounds each of the individual optical fibers (18) completely in an interspace (30) formed between the circuit carrier (12) and a front panel (2).

4. The light transmission system (20) as claimed in claim 3, characterized in that the housing (22) forms housing cylinders (24) and webs (38), wherein the housing cylinders (24) surround each of the optical fibers (18) at the cylindrical outer circumference thereof, and the webs (38) connect the housing cylinders (34) and the spacers (34) to one another.

5. The light transmission system (20) as claimed in claim 4, characterized in that the webs (38) are designed to abut the front panel (2).

6. The light transmission system (20) as claimed in claim 1, characterized in that front faces (19) of the plurality of optical fibers (18) in an optical fiber group (20-1, 20-2, 20-3, 20-4, 20-5) are situated in a common vertical plane, in order to form display panels on the display device (1), wherein the common vertical plane is situated in front of or in the plane of the front panel (2).

7. The light transmission system (20) as claimed in claim 1, characterized in that the material of the optical fibers (18) is opaque, blurred or light-scattering such that the light emerging from a front face (19) of the optical fiber (18) is essentially scattered to the entire exterior.

8. The light transmission system (20) as claimed in claim 1, characterized in that a cylindrical surface of the optical fibers (18), which is in contact with the housing (22), is highly polished to minimize losses as a result of refraction of light.

9. The light transmission system (20) as claimed in claim 1, characterized in that the spacers (34) each have a through-hole for holding screws or bolts (35) for fixing the circuit carrier (12) to the front panel (2).

10. The light transmission system (20) as claimed in claim 1, characterized in that it has a plurality of separate optical fiber groups (20-1, 20-2, 20-3, 20-4, 20-5, 20-6) in which the spacers (34) have the same length to form the same distance between the front panel (2) and the circuit carrier (12) and in which the optical fibers (18) have the same length.

11. The display device (1) as claimed in claim 10, characterized in that it is in the form of a display and operator control device (1),
wherein the circuit carrier (12) holds adjustable potentiometers (15), and operator control elements (3, 4, 5) for adjusting the potentiometers (15) protrude in front of the front panel (2), wherein the front panel (2) has exit points (32) formed in it for operative connections between the operator control elements (3, 4, 5) and the potentiometers (15), wherein the optical fibers (18) are shielded from the exit points (32) in the interspace (30) by the housing (22) of the optical fiber groups (20-1, 20-2, 20-3, 20-4, 20-5, 20-6).

12. A display device (1) for a portable mixing amplifier, wherein the display device (1) has:
a circuit carrier (12) for actuating LEDs (14); and
a front panel (2) for representing or forming display panels (19) for viewing by a user,
characterized in that the LEDs (14) are mounted on the circuit carrier (12) as SMD LEDs (14) using SMD technology; and
between the SMD LEDs (14) and the front panel (2) there is a light transmission system (20) as claimed in claim 1, wherein rear end faces (28) of the optical fibers (18) in the light transmission system (20) are positioned in front of or on the SMD LEDs (14), and front faces (19) of the optical fibers (18) are positioned in front of or in the front panel (2), to form the display panels.

13. The display device (1) as claimed in claim 12, characterized in that the optical fibers (18) protrude from apertures (26) or free spaces in the front panel (2), and the front faces (19) of the optical fibers (18) are positioned in a common vertical plane in front of or in the front panel (2).

14. The display device (1) as claimed in claim 12, characterized in that webs (38) of the housing (22) for the optical fiber groups (20-1, 20-2, 20-3, 20-4, 20-5, 20-6) abut the inside of the front panel (2).

15. The display device (1) as claimed in claim 12, characterized in that the optical fibers (18) protrude from apertures (26) or free spaces in the front panel (2), and the front faces (19) of the optical fibers (18) are positioned in a common vertical plane in the front panel (2).

16. The display device as claimed in claim 12, characterized in that the front panel (2) and the circuit carrier (12) are spaced apart from one another by the spacers (34), and are fixed to one another by means of screws or bolts (35) routed through the spacers (34).

17. The light transmission system (20) as claimed in claim 1, characterized in that it has six optical fiber groups (20-1, 20-2, 20-3, 20-4, 20-5, 20-6), of which:
a first optical fiber group (20-1) has twenty-four optical fibers (18) for display panels (19) next to rotary knobs (6);
a second optical fiber group (20-2) has sixteen optical fibers (18) for display panels (19) for slide controls (4) and/or keys for activating the slide controls (4);
a third optical fiber group (20-3) has nineteen optical fibers (18) for display panels (19) for slide controls (4) and supplementary keys or pushbutton switches;
a fourth optical fiber group (20-4) has twenty to thirty optical fibers (18) of which twenty-four optical fibers (18) are provided for display panels (19) which are arranged in two vertical rows to represent light columns or light strips;
a fifth optical fiber group (20-5) has five optical fibers (18), of which three optical fibers (18) are closely adjacent to one another and a further two optical fibers (18) are closely adjacent to one another; and
a sixth optical fiber group (20-6) has just one optical fiber (18) and a spacer (34).

18. The light transmission system (20) as claimed in claim 1, characterized in that front faces (19) of the plurality of optical fibers (18) in an optical fiber group (20-1, 20-2, 20-3, 20-4, 20-5) are situated in a common vertical plane, in order to form display panels on the display device (1), wherein the common vertical plane is situated in the plane of the front panel (2).

19. The light transmission system (20) as claimed in claim 1, wherein the spacers (34) are integrated into the housing (22).

* * * * *